United States Patent
Suh

(10) Patent No.: US 9,266,031 B2
(45) Date of Patent: Feb. 23, 2016

(54) BLOCK TOY FOR MUSIC EDUCATION

(71) Applicant: HUMAN LEAGUE CO., LTD., Seoul (KR)

(72) Inventor: Sun Il Suh, Yongin-si (KR)

(73) Assignee: Human League Co., Ltd., Seoul (KR)

( * ) Notice: Subject to any disclaimer, the term of this patent is extended or adjusted under 35 U.S.C. 154(b) by 0 days.

(21) Appl. No.: 14/389,071

(22) PCT Filed: Mar. 8, 2013

(86) PCT No.: PCT/KR2013/001903
§ 371 (c)(1),
(2) Date: Sep. 29, 2014

(87) PCT Pub. No.: WO2013/147434
PCT Pub. Date: Oct. 3, 2013

(65) Prior Publication Data
US 2015/0072586 A1  Mar. 12, 2015

(30) Foreign Application Priority Data

Mar. 29, 2012 (KR) .................. 10-2012-0032612

(51) Int. Cl.
*A63H 5/00* (2006.01)
*A63H 33/04* (2006.01)
*G09B 1/30* (2006.01)
*G09B 15/00* (2006.01)

(52) U.S. Cl.
CPC ................ *A63H 33/042* (2013.01); *G09B 1/30* (2013.01); *G09B 15/00* (2013.01)

(58) Field of Classification Search
USPC ............ 446/118, 175, 219, 397, 408; 84/600, 84/602, 609, 647, 470 R, 476
See application file for complete search history.

(56) References Cited

U.S. PATENT DOCUMENTS

| | | | | |
|---|---|---|---|---|
| 3,389,479 A * | 6/1968 | Gross | ............................ | 434/340 |
| 4,526,550 A * | 7/1985 | Lurito | ........................... | 434/340 |
| 4,609,356 A * | 9/1986 | Gilden et al. | ................. | 434/259 |
| 4,846,692 A * | 7/1989 | Delcambre | ................... | 434/159 |
| 4,968,255 A * | 11/1990 | Lee et al. | ...................... | 434/159 |

(Continued)

FOREIGN PATENT DOCUMENTS

| | | | |
|---|---|---|---|
| JP | 2001-312275 A | | 11/2001 |
| KR | 1990-0002863 Y1 | | 4/1990 |

(Continued)

OTHER PUBLICATIONS

International Search Report issued on Jun. 27, 2013, in counterpart International Application No. PCT/KR2013/001903 (1 page in English).

(Continued)

*Primary Examiner* — Kurt Fernstrom
(74) *Attorney, Agent, or Firm* — NSIP Law

(57) ABSTRACT

Disclosed is a block toy for music education which recognizes combined melody blocks so as to replay sounds in order having the same pitch as the melody blocks, thereby playing a melody. The corresponding melody block is lit up to display a playing melody block while playing a melody. It is possible to differentiate each melody block by detecting, with a mechanical switch, uneven patterns formed at the lower sides of melody blocks. Since music can be visually understood, the block toy can help the emotion and music education of children.

11 Claims, 9 Drawing Sheets

(56) References Cited

U.S. PATENT DOCUMENTS

| | | | | |
|---|---|---|---|---|
| 5,349,129 | A | * | 9/1994 | Wisniewski et al. ............ 84/600 |
| 5,364,272 | A | * | 11/1994 | Herman et al. ............... 434/159 |
| D358,421 | S | | 5/1995 | Chow et al. |
| 5,451,178 | A | * | 9/1995 | Yorozu et al. ................. 446/175 |
| 5,876,262 | A | * | 3/1999 | Kelly et al. ................... 446/118 |
| 5,906,369 | A | * | 5/1999 | Brennan et al. .............. 273/238 |
| 6,066,025 | A | * | 5/2000 | Wisniewski .................. 446/410 |
| 6,132,281 | A | * | 10/2000 | Klitsner et al. ................ 446/75 |
| 6,215,057 | B1 | * | 4/2001 | Oren-Chazon ............ 84/470 R |
| 6,271,453 | B1 | * | 8/2001 | Hacker ......................... 84/476 |
| 6,353,168 | B1 | * | 3/2002 | Sosoka et al. ................. 84/600 |
| 6,356,255 | B1 | * | 3/2002 | Weil et al. .................... 345/156 |
| 6,755,655 | B2 | * | 6/2004 | Marcus et al. ................ 434/156 |
| 6,755,713 | B1 | * | 6/2004 | Weber et al. ................. 446/143 |
| 6,991,509 | B1 | * | 1/2006 | Carley et al. ................. 446/175 |
| 7,347,760 | B2 | * | 3/2008 | Wood et al. .................. 446/175 |
| 7,654,023 | B2 | * | 2/2010 | Peters et al. ................... 40/547 |
| 8,420,923 | B1 | * | 4/2013 | Choi et al. ..................... 84/644 |
| 8,814,625 | B1 | * | 8/2014 | Long ............................ 446/175 |

FOREIGN PATENT DOCUMENTS

| | | | | |
|---|---|---|---|---|
| KR | 20-0175646 | Y1 | | 3/2000 |
| KR | 2001-0044295 | A | | 6/2001 |
| KR | 20-0274498 | Y1 | * | 5/2002 ............ A63H 33/06 |
| KR | 10-0678436 | B1 | | 2/2007 |
| KR | 10-0821250 | B1 | | 4/2008 |
| KR | 10-0883587 | B1 | | 2/2009 |
| KR | 10-0939166 | B1 | | 1/2010 |

OTHER PUBLICATIONS

International Search Report issued on Jun. 27, 2013 in counterpart International Application No. PCT/KR2013/001903 (2 pages in English, 2 pages in Korean).

* cited by examiner

BLOCK TOY FOR MUSIC EDUCATION

CROSS-REFERENCE TO RELATED APPLICATIONS

This application is a National Stage of International Application No. PCT/KR2013/001903, filed Mar. 8, 2013 and published as WO 2013/147434 on Oct. 3, 2013, which claims the benefit of Korean Patent Application No. 10-2012-0032612, filed on Mar. 29, 2012, the entire disclosures of which are incorporated herein by reference for all purposes.

TECHNICAL FIELD

The following description relates to a block toy for music education.

BACKGROUND ART

Building block toys generally play music as blocks are built, thereby helping emotional cultivation of children or stimulation of their musical interest. Korean Patent No. 939,166 registered on Jan. 20, 2010 suggests a block toy that plays music or emits light according to a three-dimensional structure including unit blocks built on a game board. These unit blocks are supplied with power through a surface terminal from an external power source, and transmit and receive information to and from a game-board body through wireless communication. Here, musical elements, such as scale, octave, sound field, tone, dynamics, and the like, are defined depending on assembled or disassembled forms of blocks, and melodies are played by detecting these assembled or disassembled block forms.

However, in such block toys, each block includes a high-priced microprocessor or a wireless communicator, thereby increasing production costs. Further, as each block depends on an electric terminal on a surface, such limitation on instruments may result in an unstable electric connection, and contaminations on a surface and the like may cause connection failure with lapse of time, thereby leading to operation errors.

Korean Laid-open Patent Publication No. 2006-0064731 published on Jun. 14, 2006 discloses a toy for music education, in which music is played according to an electronic musical score by recognizing musical note blocks inserted into holes of an electronic board with a manuscript paper written thereon. Similarly, Japanese Laid-open Patent Publication No. 2001-312275 published on Nov. 9, 2001 discloses an automatic music playing apparatus, in which musical blocks may be played in sequence by connecting side by side musical blocks, each of which has a musical score and musical notes drawn on its surface, and includes male and female connectors on both sides, and by recognizing the connected musical blocks by a main body block with a treble clef drawn on its surface.

However, such music playing blocks, which are based on professional music scores, are not suitable for toddlers or young children.

DISCLOSURE

Technical Problem

The present disclosure provides a block toy for music education that stimulates musical interests of toddlers or young children through block building without difficulty or reluctance.

Further, a block toy for music education is disclosed that helps children understand music in a visual way.

Moreover, a block toy for music education is disclosed that has durability without operation errors even when used for a long period of time.

Technical Solution

In one general aspect, there is provided a block toy including: a plurality of melody blocks that have different heights; a plurality of melody block sensors that are installed in melody block engaging portions, with which each of the plurality of melody blocks is detachably engaged, and that outputs different electric signals according to heights of the plurality of melody blocks engaged with the respective melody block engaging portions; a play control portion that includes a melody block play portion that controls playing of melodies by sequentially reproducing sounds that have pitches corresponding to the heights of the plurality of engaged melody blocks according to the electric signals output from the plurality of melody block sensors; and a reproduction portion that reproduces melodies by the control of the play control portion.

The block toy may further include a plurality of lighting portions that are installed toward the engaged melody blocks in an inner side of the melody block engaging portions; and a light emitting operation portion that lights up the plurality of lighting portions of played sounds according to the control of the play control portion.

The block toy may include a plurality of mechanical switches installed in an inner side of the melody block engaging portions to recognize uneven patterns formed at a lower side of the engaged melody blocks.

The melody block sensors may recognize the melody blocks regardless of engaging directions of the melody blocks.

The block toy may include a guiding portion that guides light upward from a lower side of the melody blocks; and an upper side light diffusing portion that diffuses the light guided by the guiding portion at an upper side of the melody blocks.

The play control portion may further include a chord play portion that divides the melody blocks into two groups, and sequentially plays melody blocks of the two groups by synthesizing sounds corresponding to heights of the melody blocks at the same time.

The block toy may further include an inter-device communication portion to communicate with other block toy, in which the play control portion may further include a chord play portion that operates in conjunction with a play control portion of the other block toy through the inter-device communication portion to play sounds by synthesizing the sounds corresponding to the heights of the melody blocks engaged with the two block toys.

The block toy may further include an inter-device communication portion to communicate with other block toy, in which the play control portion may further include a connection play portion that operates in conjunction with a play control portion of the other block toy through the inter-device communication portion to sequentially play sounds corresponding to the heights of the melody blocks engaged with the two block toys.

The block toy may further include a game progress portion that reproduces melodies by using the reproduction portion, and identifies each of the engaged melody blocks according to electric signals output from the melody block sensors to progress a game based on the identification.

The block toy may further include a plurality of sound source blocks; and a sound source block sensor that is installed in a sound source block engaging portion, with which one of the plurality of sound source blocks is detachably engaged, and that outputs different electric signals to the play control portion according to types of the sound source blocks to designate types of sound sources reproduced by the play control portion.

The block toy may include a game board body that includes an operation portion on a top surface to control the melody block engaging portions and the play control portion, and that has a bottom surface of a table form; and a frame, to which the game board body is detachably connected with the top surface of the game board body being an upper side or by turning the top surface upside down, and which includes leg-inserting holes into which legs are inserted and fixed.

The block toy may further include a stored melody play portion that extracts melodies stored in a memory to control the reproduction portion to reproduce the stored melodies.

Effect of the Invention

Once a toddler engages melody blocks of different heights with a melody block engaging portion of a main body of a game board, sounds that are determined to be high or low depending on the heights of blocks are played in sequence to reproduce melodies. Through high or low sounds simply changed according to the heights of blocks, toddlers may have interest in playing with blocks, and their interest in block building may be converted into an interest in music, thereby enabling them to learn musical sensitivity, and helping them in an emotional way.

Further, playing blocks that emit light may enhance toddlers' visual concentration, such that they may easily recognize changes in sounds according to the heights of blocks. In addition, aesthetic effects obtained by light emissions of blocks may help emotional cultivation of children.

By differently inserting musical blocks, sounds may be changed variously, thereby relieving boredom and enhancing toddlers' interest, and enabling them to learn that various sounds may be expressed with sound pitches.

By connecting a plurality of block toys, long melodies may be played beyond the limit of a general block toy that may play only about two bars. Moreover, by designating two block toys as a pair, two block toys may be played simultaneously to create a chord, and toddlers may learn basic characteristics of a chord.

After learning how to play with the block toy, toddlers may also enjoy finding blocks to match played melodies, through which they may be trained to have a perfect pitch for various sound sources or learn melodies.

BEST MODE OF THE INVENTION

Modes of the Invention

The above and other aspects of the invention will be better understood through exemplary embodiments, which will be described in more detail below with reference to the accompanying drawings.

Figure 1:
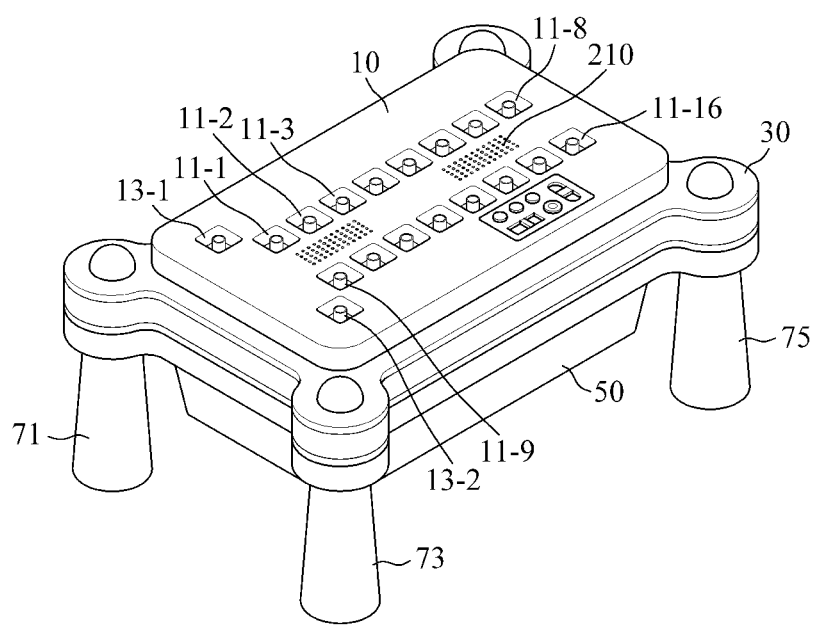
FIG. 1 is a view illustrating an exterior of a block toy for music education according to an exemplary embodiment.
Figure 2:
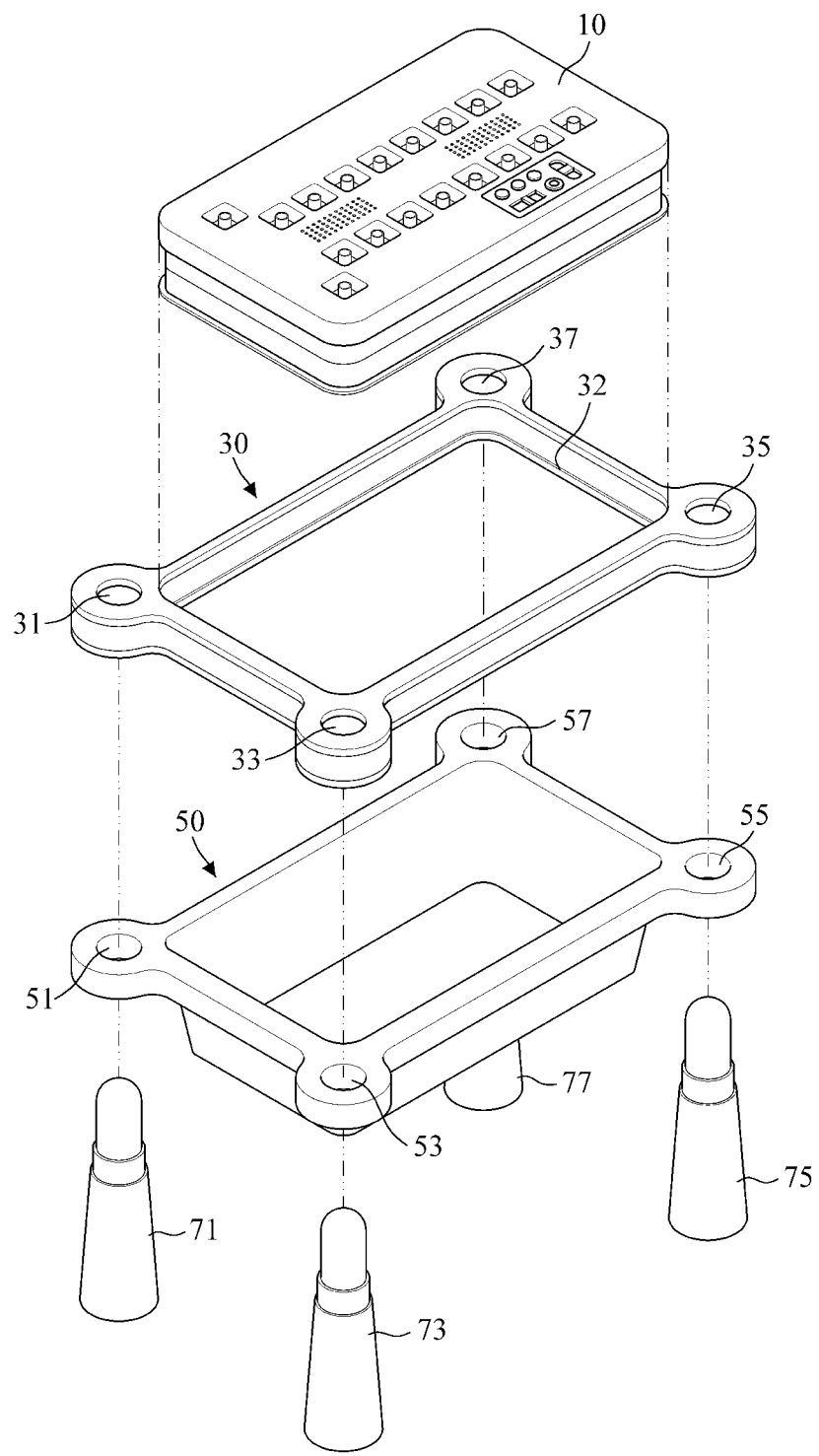
FIG. 2 is an exploded view of the block toy for music education illustrated in FIG. 1.

FIG. 1 is a view illustrating an exterior of a block toy for music education according to an exemplary embodiment. FIG. 2 is an exploded view of the block toy for music education illustrated in FIG. 1. As illustrated in FIGS. 1 and 2, the block toy according to an exemplary embodiment includes: a game board body 10; a frame 30 formed to be detachably connected to the game board body 10 with a top surface of the game board body 10 being an upper side or by turning the top surface upside down, and having four leg-inserting holes 31, 32, 33, and 34 that are fixed by inserting legs into four corners; and four legs 71, 72, 73, and 74 that are inserted into the leg-inserting holes 31, 32, 33, and 34 of the frame 30.

The legs 71, 72, 73, and 74 may be forcibly inserted into the leg-inserting holes 31, 32, 33, and 34. A rabbet 10 that supports the game board body 100 may be formed on an inner surface of the frame 30. In an exemplary embodiment, a top surface and a bottom surface of the game board body 10 are screw-coupled with a flange interposed therebetween, in which one or more printed circuit boards and components are installed with one circuit mounted therein. The game board body 10 may be connected to the frame with its top surface being an upper side or by turning the top surface upside down. In an exemplary embodiment, when children play with the block toy as a musical instrument, the game board body 10 is connected to the frame 30 with its top surface being an upper side. At other times, the game board body 10 is connected to the frame 30 by turning its top surface upside down, such that the game board body 10 may be used for other plays or for other learning purposes. When being used as a table, stored sound sources, e.g., MP3 sound sources preferred by children may be played.

Additionally, leg-inserting holes 51, 52, 53, and 54 may be formed on a bottom surface of the frame 30 in positions identical to the frame 30, and a housing case 50 that includes a housing space for housing blocks or other objects. For example, legs 71, 72, 73, and 74 may be detached from the leg-inserting holes 31, 32, 33, and 34 to be housed in the housing case 50, thereby enabling a convenient arrangement of block toys and preventing missing of components, and blocks may be stored neatly.

However, the present exemplary embodiments are not limited to this table-type block toy. For example, a block toy for music education may be in a form of trains. The game board body 10 is detachably connected to a top surface of each train, and a housing case may be provided at the bottom surface of each train to arrange and store blocks. By connecting train-type block toys, a sequence of blocks inserted into each train may be played.

In an exemplary embodiment, melody block engaging portions 11 for engaging melody blocks, and a manipulation panel 90 are installed on a top surface of the game board body 10.

Figure 3A:
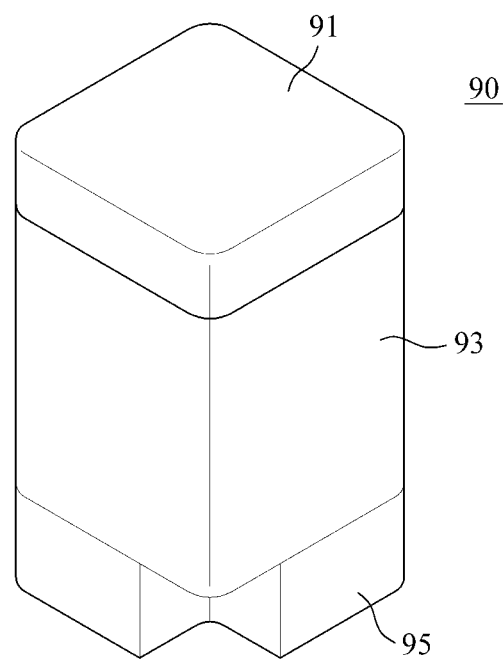
FIG. 3A is a schematic view illustrating an exterior of a melody block 90 according to an exemplary embodiment.
Figure 3B:
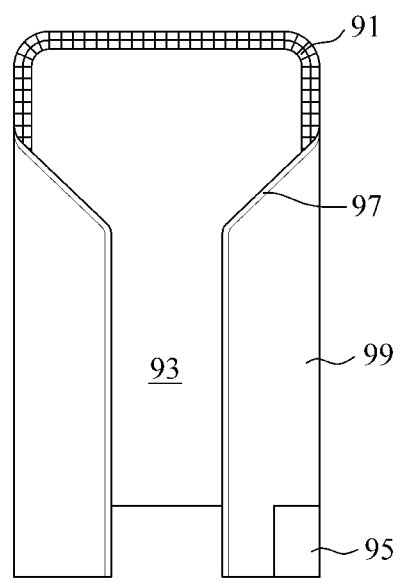
FIG. 3B is a cross-sectional view illustrating an interior structure of the melody block 90 illustrated in FIG. 3A.

FIG. 3A is a schematic view illustrating an exterior (outer appearance??) of a melody block 90 according to an exemplary embodiment. FIG. 3B is a cross-sectional view illustrating an interior structure of the melody block 90 illustrated in FIG. 3A. In an exemplary embodiment, melody blocks have heights that are proportional to respective sound pitches, and tones of the melody blocks are coded in an uneven pattern 95 at the bottom of the melody block. As illustrated in FIGS. 3A and 3B, the melody block 90 includes a guiding portion 93 that guides light upward from the bottom of the block, and an upper side light diffusing portion 91 that diffuses light guided by the guiding portion 93 on the upper side of the block. In an exemplary embodiment, the bottom surface of the guiding portion 93 is transparent so that light may be introduced, and an inward mirror surface 97 is formed on sides of the guiding portion 93 to reflect the guided light toward the inside so that the light may not escape to the outside. Surfaces of the upper side light diffusing portion 91 may be coated in various colors so that the top sides of each block may emit light in various colors.

A melody block sensor 331 may include a plurality of mechanical switches installed on the inside of the melody block engaging portion 11 so that an uneven pattern formed on the bottom side of the engaged melody block 90 may be recognized. In an exemplary embodiment, the uneven pattern is formed on an outer wall of the bottom side of the melody block 90, and a plurality of mechanical switches 40 may be installed on an inner wall of the melody block engaging portions 11.

Figure 3C:
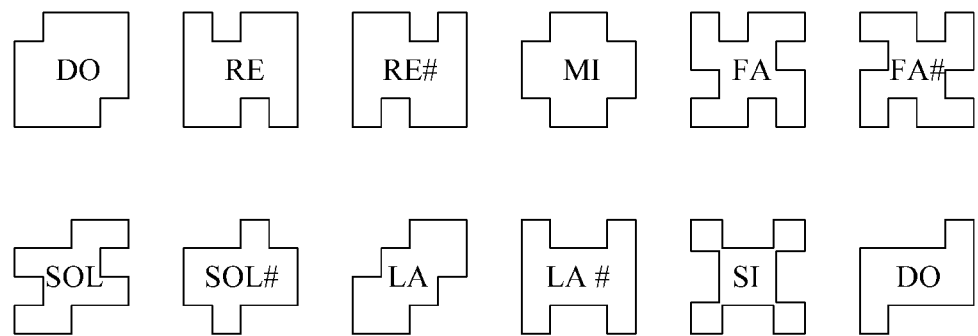
FIG. 3C is a view illustrating an example of uneven patterns as seen from the bottom surface of the melody block 90.

FIG. 3C is a view illustrating an example of uneven patterns 95 as seen from the bottom surface of the melody block 90. Each of the patterns illustrated in FIG. 3C is rotationally symmetric, and may be identified even by sensing only two surfaces.

As illustrated in FIG. 3B, the melody block 90 includes the guiding portion 93 and the upper side light diffusing portion 91, which are integrally formed as one component in such a manner that the top surface of the block is coated in colors and the outer bottom surface thereof is coated with the mirror surface 97 to be inserted into a main block body 99 having the uneven patterns 95 at the bottom.

Figure 4A:
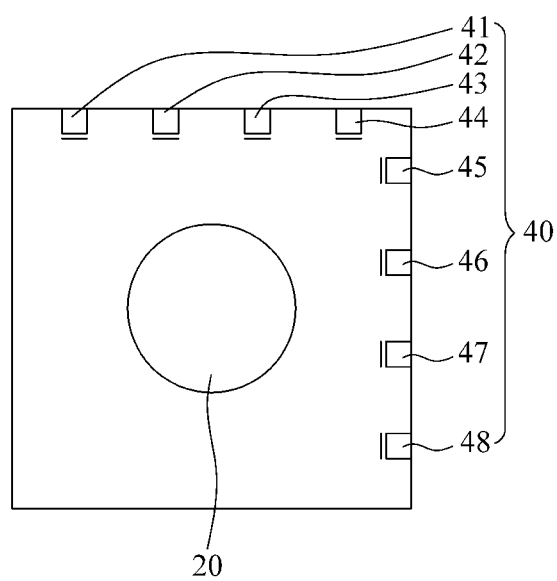
FIG. 4A is a plane view of a melody block engaging portion according to an exemplary embodiment.
Figure 4B:
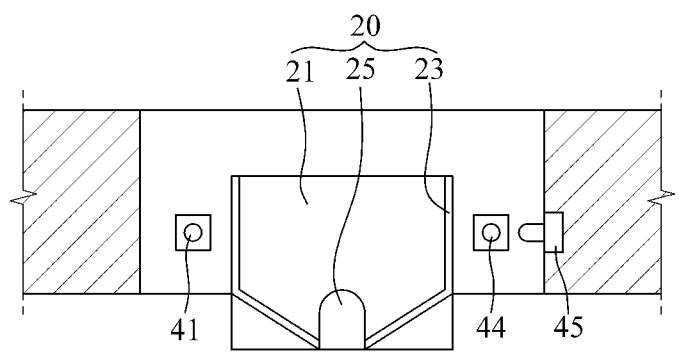
FIG. 4B is a cross-sectional side view illustrating the melody block connector illustrated in FIG. 4A.

The melody block engaging portions 11, with which melody blocks are detachably engaged, are formed on a top surface of the game board body 10. FIG. 4A is a plane view of a melody block connector according to an exemplary embodiment. FIG. 4B is a cross-sectional side view illustrating the melody block connector illustrated in FIG. 4A. A plurality of mechanical switches 40 are installed on the inner wall of the melody block engaging portions 11 to recognize uneven patterns formed on the outer wall at the bottom of the engaged melody blocks 90. Switches are inactivated and protrude at concave portions of these patterns, and at concave portions of these patterns, switches are pressed down and activated to be sensed by a circuit. An "on" state and an "off" state of eight switches are identified by binary digits of "0" and "1" respectively, such that the switches may be recognized by an 8-bit binary digit code. In the exemplary embodiment of FIG. 3C, "Do" is identified as "01111110", and "Re" is identified as "01000000". In the case of "Re", if the block is turned by 90 degrees, it will be identified as "00000100", but by programming the two codes to be identified as "Re", the two codes will be identified as an identical name of a key regardless of a direction where a block is inserted. By forming patterns of blocks to be rotationally symmetric, and by considering rotation in a program that recognizes patterns of blocks, or by combining the two, it is possible to recognize a block as an identical name of a key regardless of a direction where a block is inserted.

In another exemplary embodiment, a plurality of lighting portions 20, which are installed toward the engaged blocks, are provided on the inner side of the melody block engaging portions 11 so that played melody blocks may emit light. In an exemplary embodiment, as illustrated in FIG. 4B, the lighting portion 20 includes a light-emitting diode 25, and a light guiding member 21 that is made of a transparent material, e.g., an acrylic material, has a groove into which a light emitting diode is inserted, and a reflection surface that reflects light is coated on the bottom surface and on the side wall. The top surface of the light guiding member 21 is transparent, and is tightly attached to the bottom surface of the guiding portion 93 of the melody block 90 to guide light continuously.

In still another exemplary embodiment, uneven patterns are formed at the bottom surface of the melody block, and a plurality of mechanical switches may be installed at the bottom of the respective melody block engaging portions.

Figure 5:
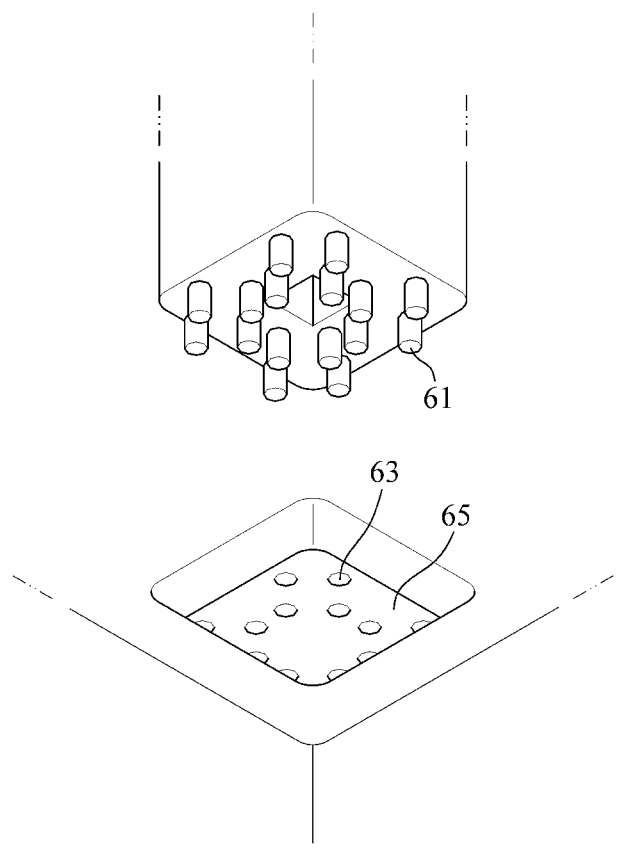
FIG. 5 is a view illustrating an engagement structure of melody blocks according to another exemplary embodiment.

FIG. 5 is a view illustrating an example of a melody block according to another exemplary embodiment. An upper diagram of FIG. 5 illustrates an example of an uneven pattern formed on a bottom surface of a block. By performing patterning that removes or maintains protruded columns 61 at predetermined positions, identification information of blocks may be identified. A lower diagram of FIG. 5 illustrates an example of a melody block sensor 331 formed on the bottom of the block engaging portions 11 according to the exemplary embodiment of FIG. 5. The melody block sensor 331 has mechanical switches (not shown) below illustrated keycaps 63, such that when protruding columns of an uneven pattern are inserted, the keycaps 63 descend with respect to a bottom surface 65 and the switches are mechanically pressed down. A microprocessor of a control portion 110 recognizes a pattern by scanning whether the switch is on or off. Further, other than the mechanical switch, an optical sensing switch or other contact switches may also be used. In the exemplary embodiment of FIG. 5, the pattern is in a radially symmetric form, so that the pattern may be recognized as identical regardless of a direction where a block is connected. However, even if patterns are not in a radially symmetric form, a control portion 110 may be programmed to recognize different patterns as identical.

A configuration of identifying melody blocks is not limited thereto, and a configuration of identifying, for example, an RF-ID built in a block, or an optical pattern may also be used.

In another exemplary embodiment, sound source block engaging portions 13-1 and 13-2 may be formed on the top surface of the game board body 10. Pictures are drawn on these sound source blocks so that children may identify types of sounds, e.g., sounds of musical instruments such as piano, trumpet, xylophone, and drum, animal sounds such as dogs and birds, human voices that sing names of keys, a fart sound, or the like. By combining different sound source blocks, types of sounds reproduced by the block toy may be changed.

In still another exemplary embodiment, a manipulation panel 90 is provided on the top surface of the game board body 10. The manipulation panel 90 includes a knob 91 that controls ON or OFF of a power source and volumes of playing sounds, a knob 92 that controls a sound beat, i.e. a tempo, a knob 93 that designates types of games, a slide switch 94 to select a connection playing or a chord playing, a slide switch to select a playing mode, a game mode, or a mode for playing stored melodies, and a play button 95 to start playing after blocks are inserted. Modes of the two slide switches will be described in detail later.

Figure 6:
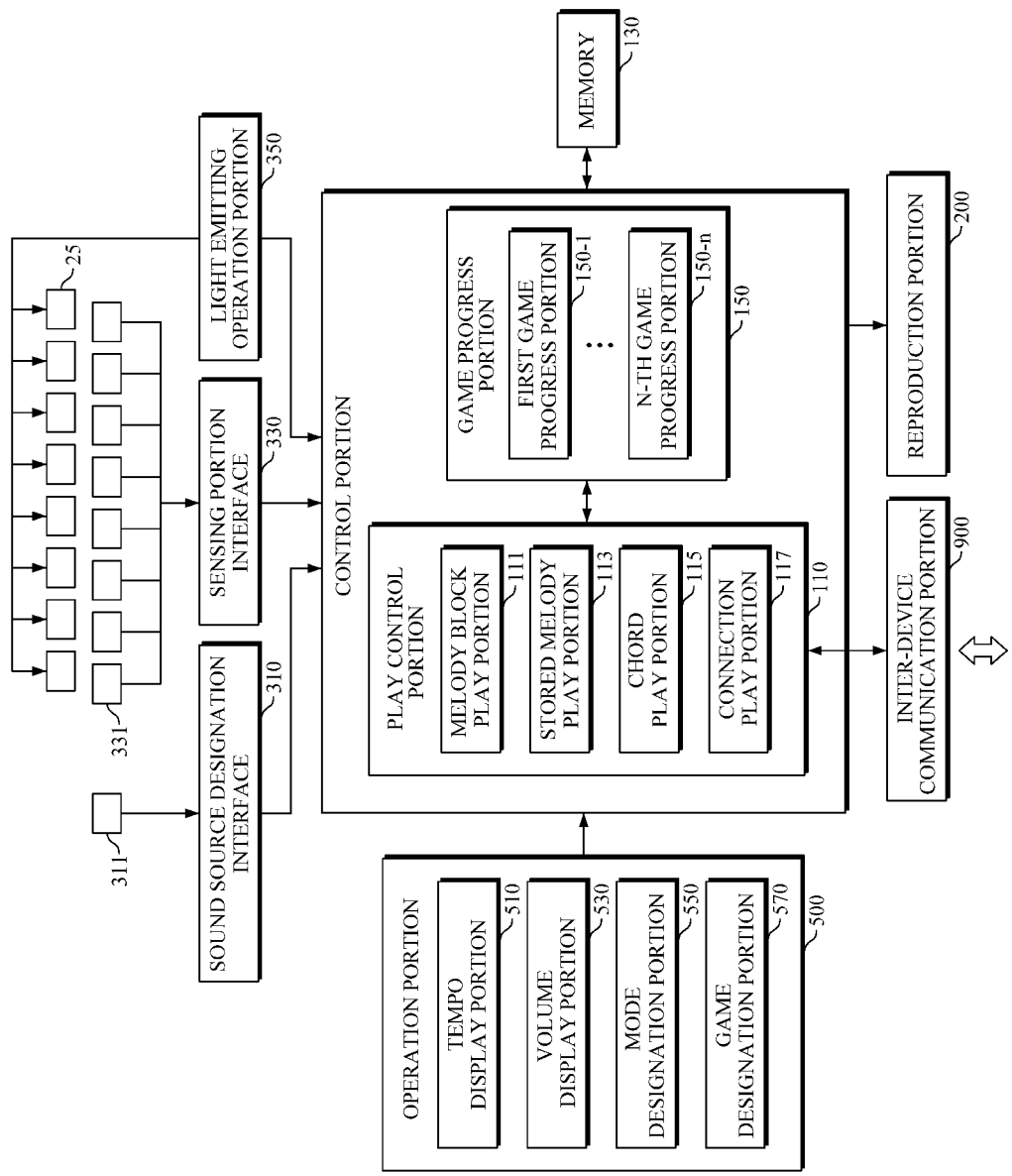
FIG. 6 is a schematic view illustrating a block toy according to an exemplary embodiment.

FIG. 6 is a schematic view illustrating a block toy according to an exemplary embodiment. As illustrated in FIG. 6, the block toy for music education includes a microprocessor, a control portion 100 that is implemented by a program executed by the microprocessor, a memory 130 that stores an operating program, sound source data, and execution data, and a reproduction portion 200 that reproduces sound sources. Constituent elements indicated in blocks in the control portion 100 are implemented by a program corresponding to a microprocessor. Accordingly, it should be understood that each block includes a program code, and when it comes to describing these products, electronic products including computer programs should be defined by their functions. Further, each block that functionally separates these program codes should not be construed as being strictly distinctive from each other.

The memory 130 may be, for example, one flash memory, or may include EEPROM and RAM. In an exemplary embodiment, the reproduction portion 200 reproduces MIDI sound sources. In the exemplary embodiment of FIG. 1, two rows of blocks may be inserted, and the two rows of blocks may be reproduced sequentially, or may be synthesized to be simultaneously played as a chord. Accordingly, the reproduction portion 200 may further include a mixer circuit. For example, the reproduction portion 200 may include two MIDI players, a mixer that mixes outputs of the two MIDI players, an amplifier that amplifies, by a predetermined degree, outputs mixed by the mixer, and a speaker that outputs the amplified audio signal as an audible signal.

The block toy for music education includes a plurality of melody block sensors 331 that are installed in melody block engaging portions 11, with which each of the plurality of melody blocks 90 is detachably engaged, and that outputs different electric signals according to heights of the plurality of melody blocks 90 engaged with the respective melody block engaging portions 11. In an exemplary embodiment, the melody block sensors 331 include a plurality of mechanical switches installed on the inner wall of the melody block engaging portions to recognize uneven patterns formed on the outer bottom wall of the engaged melody blocks. The melody block sensors 331 recognize the melody blocks regardless of directions where the melody blocks are engaged, which are described above with reference to FIGS. 3C, 4A, and 4B.

In an exemplary embodiment, a sensor interface 330 scans these switches to output the scanned switches to the control portion 100 as binary digits. The melody block sensors 331 may be individually input through an input/output port of the control portion 100.

The control portion 100 includes a play control portion 110 that includes a melody block play portion 111 that sequentially plays sounds that have pitches corresponding to heights of melody blocks engaged according to electric signals output from the melody block sensors 331. In an exemplary embodiment, a play control portion 110 controls the reproduction portion 200 according to a volume or tempo displayed by a tempo display portion 510 and a volume display portion 530.

In another exemplary embodiment, the block toy may further include a sound source block sensor 311 that is installed in a sound source block engaging portion 13, with which one of the plurality of sound source blocks is detachably engaged, and that outputs different electric signals to the play control portion 110 according to types of the sound source blocks to designate types of sound sources reproduced by the play control portion 110.

Similarly to melody blocks, an uneven pattern, an optical pattern, or a means such as an RFID is provided at the bottom of a sound source block, such that a circuit installed in the game board body 10 may identify sound source blocks. In the exemplary embodiment, sound source data are all stored in a memory of the game board body 10, and a sound source block merely functions to designate one of the data.

However, the present disclosure is not limited to the exemplary embodiment. For example, an RFID may be built in sound source blocks, and MIDI data of each sound source are stored in an inner memory of an RFID, such that an RFID reader circuit provided in a circuit of the game board body 10 may directly read sound source data. In another example, a memory is provided in sound source blocks, and data of the memory may be read by a circuit in the game board body 10 through an electric contact point provided in sound source block engaging portions. In this case, as sound source data are provided in sound source blocks, new types of melodies may be provided by buying sound source blocks.

The block toy drives a sound source block sensor 311, and may further include a sound source designation interface 310 that outputs an input signal to the control portion 100. The sound source designation interface 310 may be connected to one of input/output ports of a microprocessor included in the control portion 100.

In another exemplary embodiment, the block toy may further include a light-emitting operation portion 350. The light-emitting operation portion 350 is array light-emitting diode (LED) chips where a light-emitting diode 25 of a lighting portion 20 is separately connected. By registering values to a register of the light-emitting operation portion 350, the control portion 100 may turn on or off a light-emitting diode associated with bits.

In still another exemplary embodiment, the block toy may further include a stored melody play portion 113 that extracts melodies stored in the memory 130 to control the reproduction portion 200 to reproduce the stored melodies. These stored melodies may be a MIDI data file that includes various MIDI sound sources, or MP3 sound sources. Children that enjoy the block toy may listen to stored music without controlling playing with blocks.

Additionally, the play control portion 110 may further include a chord play portion 115 that divides the melody blocks into two groups, and sequentially plays the melody blocks of the two groups by synthesizing sounds at the same time that correspond to heights of the melody blocks. For example, in the block toy illustrated in FIG. 1, each of two rows of sound source block engaging portions may be divided into two groups. In the two groups, starting from the engaged blocks on the right, sounds of the two blocks are sequentially synthesized at the same time to be played, thereby helping children to have interest in chord.

In addition, the block toy may further include an inter-device communication portion 900 to communicate with other block toys. The play control portion 110 may further include a chord play portion 115 that operates in conjunction with other play control portions of other block toys through the inter-device communication portion 900 to synthesize sounds corresponding to heights of blocks engaged with the two block toys. The inter-device communication portion 900 may be, for example, an RS232 serial communication interface. By connecting block toys with a serial communication cable, two block toys may be interconnected. Further, by providing two inter-device communication portions 900, three or more block toys may be interconnected, in which a block toy connected in front serves as a master to control all connected block toys. The master block toy checks reproduction modes designated by the mode designation portion 550. If a reproduction mode is a chord playing mode, the chord play portion 115 is executed.

In an exemplary embodiment, the chord play portion 115 of the master block toy may transmit tempo information and volume information displayed by the operation portion 500 to a slave block toy through the inter-device communication portion 900. Then, the chord play portion 115 of the master block toy instructs a slave block toy to start playing, and reads the melody block detecting portion 331 to sequentially play sounds of melody blocks according to a tempo and volume displayed by the operation portion 500. A chord play portion 115 of a slave block toy determines a setting of the reproduction portion 200 based on tempo information and volume information received through inter-device communication portion 900, and waits for an instruction to start playing. In response to receiving the instruction to start playing, the chord play portion 115 of the slave block toy reads the melody block detecting portion 331 to control the reproduction portion 200 to sequentially play sounds of melody blocks.

In another exemplary embodiment, the block toy may further include an inter-device communication portion 900 that communicates with other block toys. The play control portion 110 may further include a connection play portion 117 that operates in conjunction with other play control portions of other block toys through the inter-device communication portion 900 to sequentially play sounds corresponding to heights of blocks engaged with two block toys. The inter-device communication portion 900 may be, for example, an RS232 serial communication interface. By connecting block toys with a serial communication cable, two block toys may be interconnected. Further, by providing two inter-device communication portions 900, three or more block toys may be interconnected, in which a block toy connected in front serves as a master to control all connected block toys. The master block toy checks reproduction modes designated by the mode designation portion 550. If a reproduction mode is a connection play mode, the connection play portion 117 is executed.

In an exemplary embodiment, the connection play portion 117 of the master block toy may transmit tempo information and volume information displayed by the operation portion 500 to a slave block toy through the inter-device communication portion 900. Subsequently, the connection play portion 117 of the master block toy reads the melody block detection portion 331 to sequentially play sounds of melody blocks according to a tempo and volume displayed by the operation portion 500, and then the connection play portion 117 of the master block toy instructs a slave block toy to start playing. A connection play portion 117 of a slave block toy determines a setting of the reproduction portion 200 based on tempo information and volume information received through inter-device communication portion 900, and waits for an instruction to start playing. In response to receiving the instruction to start playing, the connection play portion 117 of the slave block toy reads the melody block detecting portion 331 to control the reproduction portion 200 to sequentially play sounds of melody blocks.

In addition, the block toy may further include a game progress portion 150 that reproduces melodies by using the reproduction portion 200, and identifies melody blocks engaged according to electric signals output from the melody block sensors 331 to progress games based on the identification. For example, a first game progress portion 150-1 progresses a game in such a manner that melodies of four bars stored in the memory 130 are repeatedly played by the reproduction portion 200 to recognize melody blocks engaged with the melody block detecting portion 331. A beep sound is output to indicate an error if a melody block having a sound different from a played melody sound is engaged with the melody block detecting portion 331. If a correct melody block is engaged, a short melody for celebration is output. If all the four bars are complete, a complimentary comment, e.g., "good job" may be output. If failed to complete within a predetermined time, a comment, e.g., "please try one more time" may be output.

For example, a second game progress portion 150-2 may progress a game of engaging blocks to match names of keys told by the block toy. The reproduction portion 200 outputs 16 names of keys through voice, and children find blocks corresponding to the names of keys to sequentially engage blocks with the block toy. The melody block detecting portion 331 recognizes engaged melody blocks. If melody blocks of names of keys, which are different from names of keys displayed by the melody block detecting portion 331, are engaged, a beep sound is output to indicate an error. If a correct melody block is engaged, a short melody for celebration is output. If all the four bars are complete, a complimentary comment, e.g., "good job" may be output. If failed to complete within a predetermined time, a comment, e.g., "please try one more time" may be output.

For example, a third game progress portion 150-3 may progress a game of engaging blocks according to a drum game or a sound beat. In the game, children engages blocks as fast as possible in response to a drum sound output by the reproduction portion 200 that indicates a beat. It is checked whether blocks are engaged correctly in accordance with a drum beat, with types of blocks being unchecked. If blocks are not correctly engaged, a score is reduced, and a final score may be output through voice.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A block toy comprising:
a plurality of melody blocks that have different heights;
a plurality of melody block sensors that are installed in melody block engaging portions, with which each of the plurality of melody blocks is detachably engaged, the plurality of melody block sensors being configured to sequentially detect and outputs different electric signals according to uneven patterns formed at a lower side of the plurality of melody blocks engaged with the respective melody block engaging portions;
a play control portion that includes a melody block play portion configured to control playing of melodies by sequentially reproducing sounds that have pitches corresponding to the uneven patterns formed at the lower side of the plurality of engaged melody blocks according to the electric signals output from the plurality of melody block sensors; and
a reproduction portion configured to reproduce melodies by the control of the play control portion.

2. The block toy of claim 1, further comprising:
a plurality of lighting portions that are installed toward the engaged melody blocks in an inner side of the melody block engaging portions; and
a light emitting operation portion configured to light up the plurality of lighting portions of played sounds according to the control of the play control portion.

3. The block toy of claim 1, wherein the melody blocks comprises:

a guiding portion configured to guide light upward from a lower side of the melody blocks; and an upper side light diffusing portion configured to diffuse the light guided by the guiding portion at an upper side of the melody blocks.

4. The block toy of claim 1, wherein:

the melody block sensors comprise a plurality of mechanical switches installed in an inner side of the melody block engaging portions to recognize radially symmetric uneven patterns formed at a lower side of the engaged melody blocks; and the melody block sensors are configured to recognize the melody blocks regardless of engaging directions of the melody blocks.

5. The block toy of claim 1, further comprising:

a plurality of sound source blocks; and a sound source block sensor that is installed in a sound source block engaging portion, with which one of the plurality of sound source blocks is detachably engaged, the sound source block sensor being configured to output different electric signals to the play control portion according to types of the sound source blocks to designate types of sound sources reproduced by the play control portion.

6. The block toy of claim 1, further comprising a stored melody play portion configured to extract melodies stored in a memory to control the reproduction portion to reproduce the stored melodies.

7. The block toy of claim 1, wherein the play control portion further comprises a chord play portion configured to divide the melody blocks into two groups, and sequentially plays melody blocks of the two groups by synthesizing sounds corresponding to heights of the melody blocks at the same time.

8. The block toy of claim 1, further comprising an inter-device communication portion configured to communicate with an other block toy, wherein the play control portion further comprises a chord play portion configured to operate in conjunction with a play control portion of the other block toy through the inter-device communication portion to play sounds by synthesizing the sounds corresponding to the heights of the melody blocks engaged with the two block toys.

9. The block toy of claim 1, further comprising an inter-device communication portion configured to communicate with an other block toy, wherein the play control portion further comprises a connection play portion configured to operate in conjunction with a play control portion of the other block toy through the inter-device communication portion to sequentially play sounds corresponding to the heights of the melody blocks engaged with the two block toys.

10. The block toy of claim 1, further comprising a game progress portion configured to reproduce melodies by using the reproduction portion, and configured to identify each of the engaged melody blocks according to electric signals output from the melody block sensors to progress a game based on the identification.

11. The block toy of claim 1, comprising:

a game board body comprising a top surface having an operation portion configured to control the melody block engaging portions, and a bottom surface of a table form; and a frame, to which the game board body is detachably connected with the top surface of the game board body being an upper side or by turning the top surface upside down, the frame comprising leg-inserting holes configured for legs to be inserted and fixed therein.

* * * * *